Oct. 20, 1942.    G. O. MATTER    2,299,334
ROTARY PLOW
Filed May 29, 1939    5 Sheets-Sheet 3
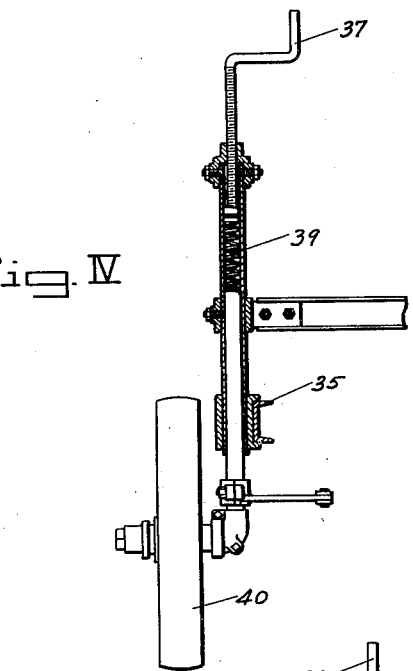
Fig. IV
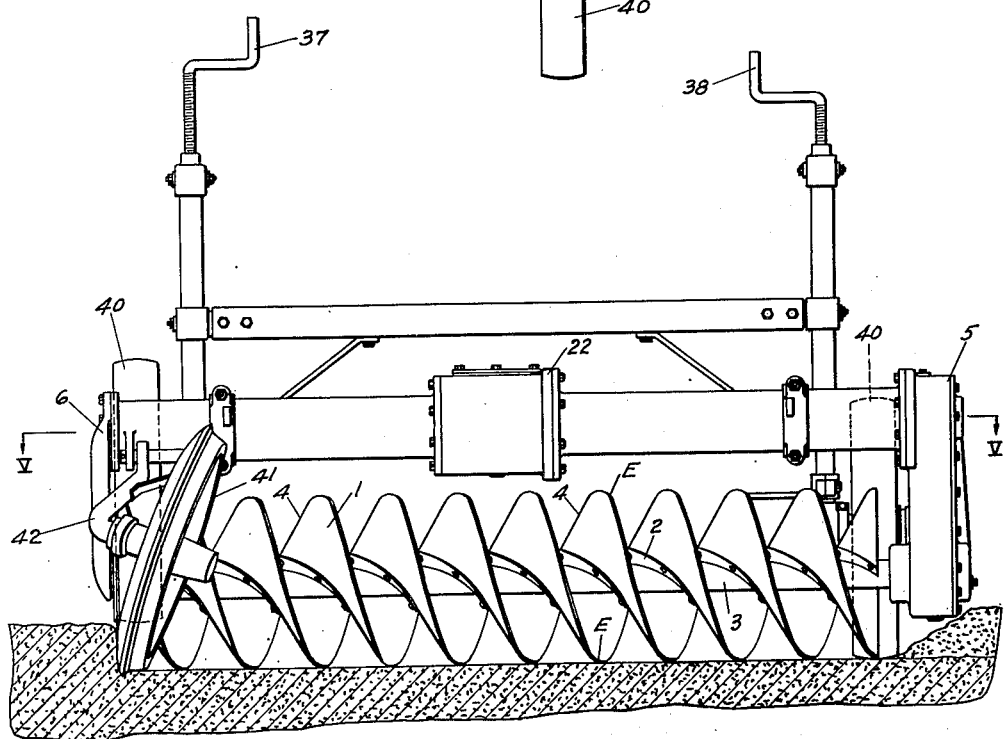
Fig. III
INVENTOR.
GUSTAVE O. MATTER
BY
ATTORNEY

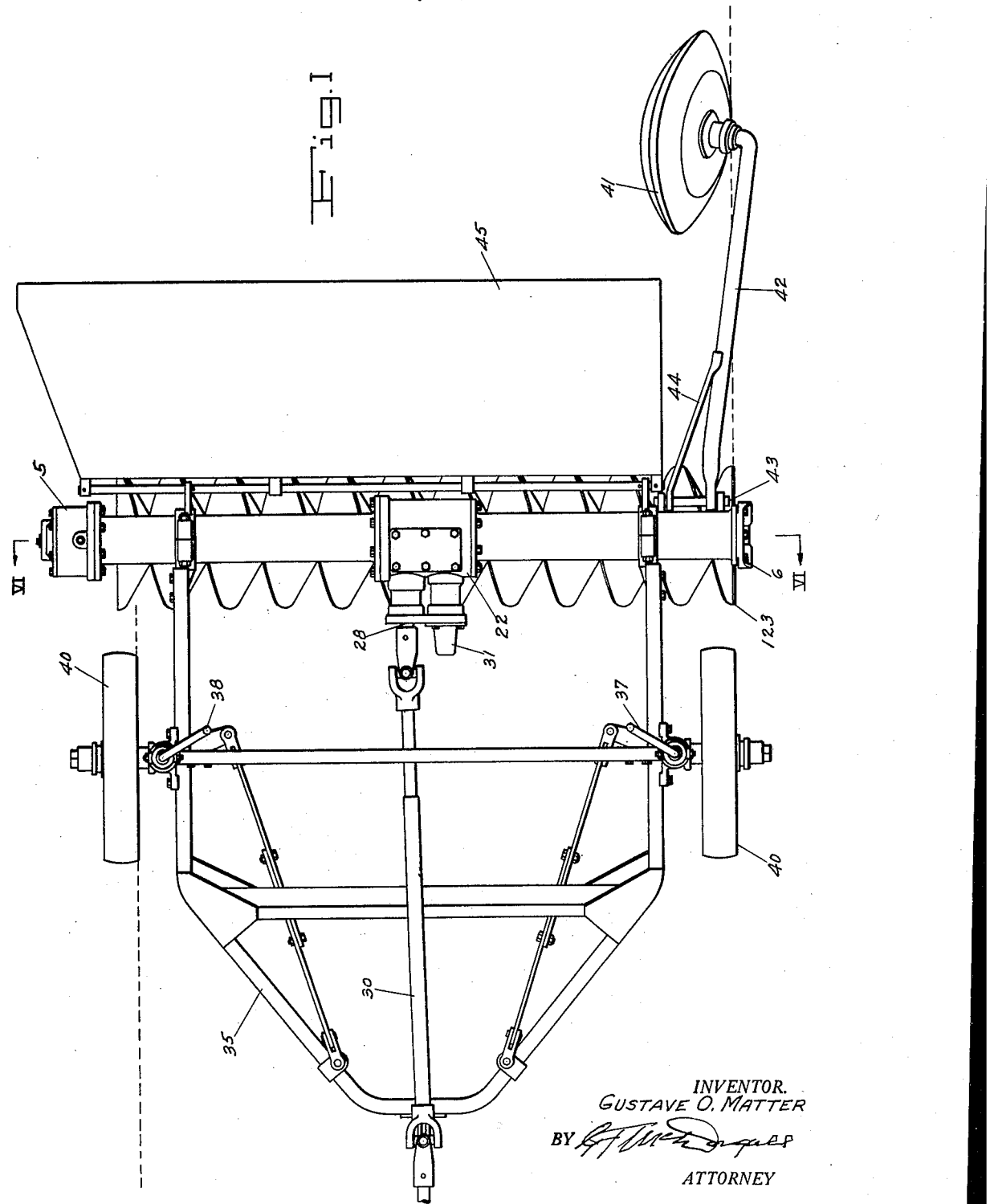

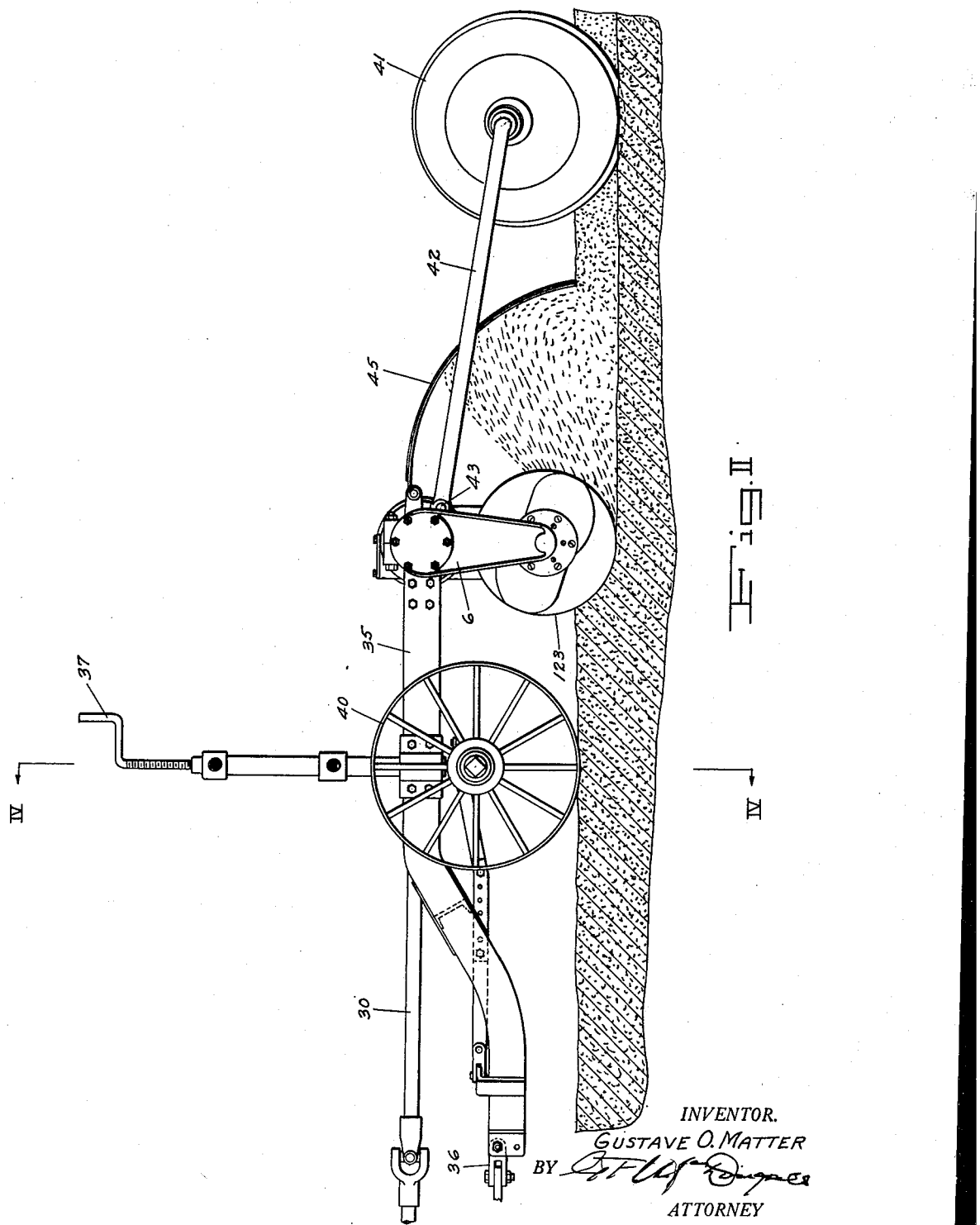

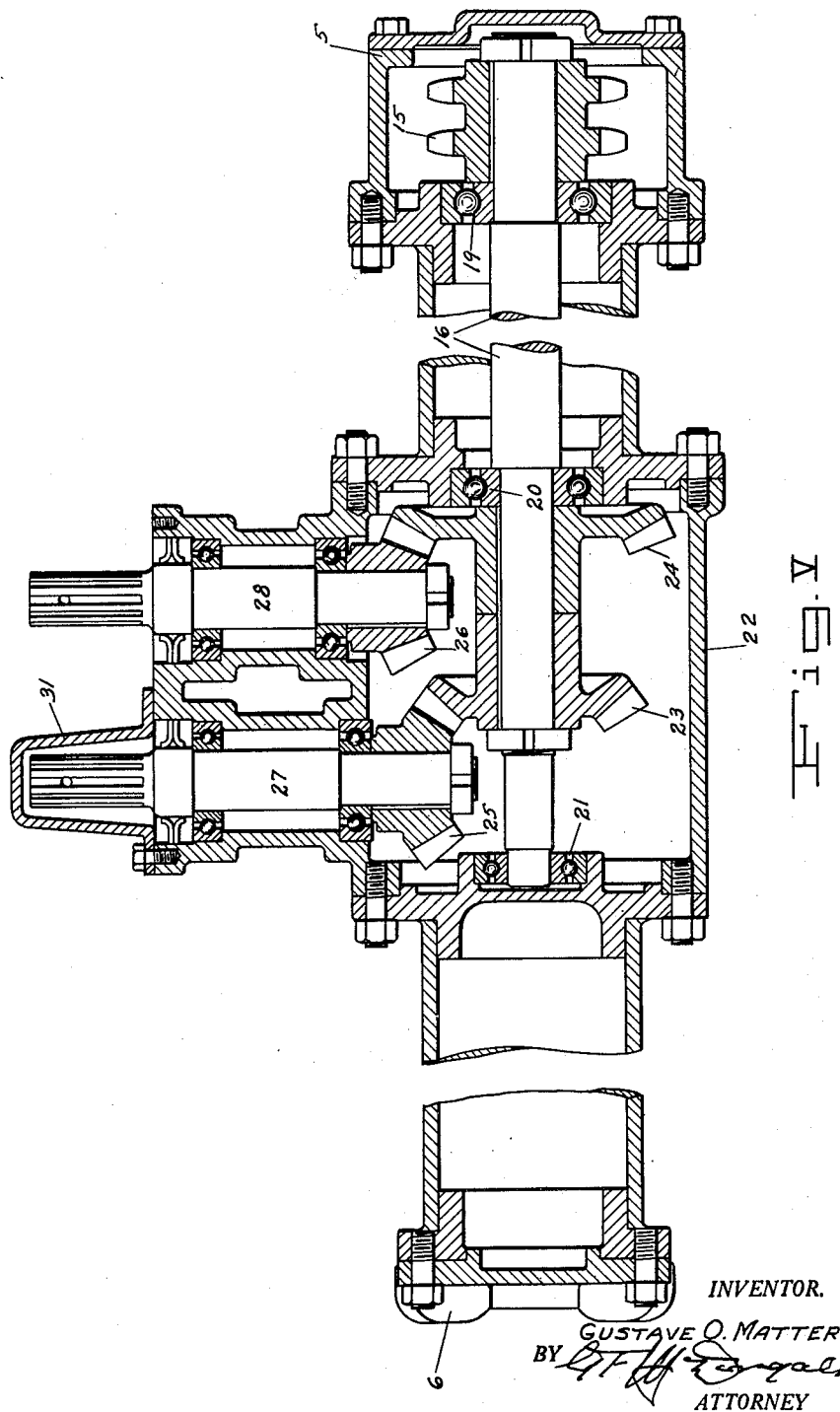

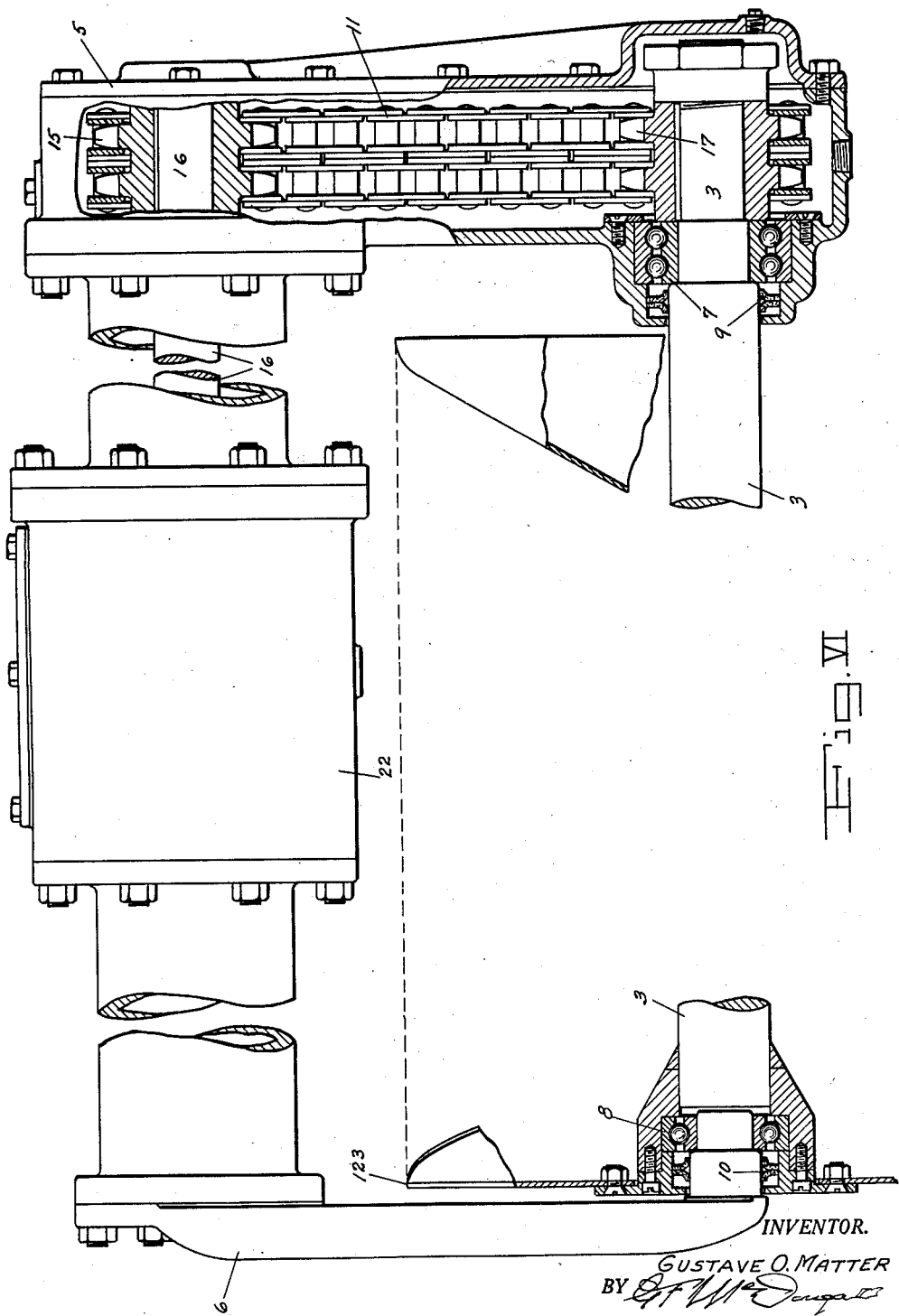

Patented Oct. 20, 1942

2,299,334

UNITED STATES PATENT OFFICE 2,299,334

ROTARY PLOW

Gustave O. Matter, Portland, Oreg.

Application May 29, 1939, Serial No. 276,331

8 Claims. (Cl. 97—41)

This invention relates to a rotary plow, generally operated by a tractor and at the same time attached to the power take-off of the tractor so that the cutter element will be given a rotary motion in the same direction but considerably faster than the ground speed of the plow.

I am aware that spiral plows have been proposed, but so far as I am aware, none of them have been equipped with a cutter element that possessed the virtues of my new cutter, hereinafter described.

An object of the invention is to so construct the blade of a spiral rotary plow that thrust is lessened to a point where it may be easily supported.

Another object is a cutter that does not clog in moist soil, due to the cut material being held, in effect, by only one metal surface from whence it is thrown by centrifugal force in much the same way that soil is thrown from a shovel.

A still further object is a mounting for the cutter that permits it to be driven from the tractor overdrive without skew gears as has heretofore been necessary with rotary plows of the character referred to, in order to get any clearance of cut soil.

A still further object, contributed to by the special cutter, is an oil holding dirt proof mounting for the plow cutter element, that contains the drive transmissions.

It is an objective to form cutting surfaces that are adapted to cut stubble and humps of vegetation, roots, etc.; further, that the thrust shall be angularly forward to tend to self-propulsion rather than absorb power in resisting end reaction.

I accomplish the objects stated and others that will be apparent to those skilled in the agricultural machinery art, by the structure illustrated in the accompanying drawings, copied in all essential details from a highly successful rotary plow that has met the very critical test of two full seasons of use in very diverse soils of widely varying moisture conditions.

In the drawings, which show a plow to be drawn by a tractor, with power supplied to the cutter to revolve it faster than rolling contact—

Fig. I is a top view of my new rotary plow, showing a power take-off connection immediately over a tractor hitch;

Fig. II is a side elevation of Fig. I showing the relationship of the power take-off and tractor hitch, and particularly showing how the cut soil is thrown directly behind the cutter;

Fig. III is a rear view of the plow with the soil apron removed, to particularly show the clear space through which the cut soil is thrown by virtue of my new type cutter.

Fig. IV is a view of one of the spring supported adjustable ground wheels that are necessary, taken as a section on IV—IV, Fig. II;

Fig. V is a section of the two-speed drive (see the line V—V, Fig. III) with scale larger, found adequate with a power take-off having more than one speed; and Fig. VI is a partial section on VI—VI, Fig. I, of the drive, which includes the subject matter of Fig. V in full and additionally shows the general relationship of the drive to the cutter member, mounted on the driven shaft more completely described hereinafter.

In the drawings, the most important thing is given the numeral 1, that is my new cutter which is an oblique helicoid as distinguished from the common helicoid employed on a conveyor. How to make it is shown and claimed in my co-pending application, Serial Number 276,332, filed May 29, 1939, which issued November 11, 1941, as Patent Number 2,262,691.

For the purposes of this specification, an oblique helicoid is defined as a surface that is curved in one direction and flat in the direction which is normal to the curve, whose generatrix glides along a fixed helix at a constant angle to its axis, which angle is less than a right angle.

It is to be noted that the oblique helicoid is made of plate steel, the inside and outside surfaces of which are straight on any axial section, though at an angle to the axis of rotation, preferably about thirty degrees from a line normal to the axis. See the angle in Fig. III, which is good but not critical.

2 is a spiral flange, preferably welded by autogenous welding to the shaft 3. The oblique helicoid cutter 1 may be bolted thereto so that it can be renewed from time to time as wear makes such action necessary. The oblique helicoid 1 will of necessity be made in several pieces as explained in the copending application referred to, the sections being butt-welded together in a single coil. The entire assembly of oblique cutter, flange and shaft will be referred to as the cutter 123, and no distinction will be made between the two flights.

The cutter 123 is supported at both ends by housings 5 and 6 wherein are placed suitable bearings such as 7 and 8 with the customary dust proofings 9 and 10.

The housing 5 contains the double roller chain 11, which takes power from the sprocket 15 and delivers it to the sprocket 17 in the well understood manner, the sprocket 15 being made rigid with the shaft 16, later described, and the sprocket 17 being made fast to the shaft portion 3 of the cutter 123.

The shaft 16 is supported by bearings 19, 20 and 21 and they in turn are built into the tubular housing 22, a further description of which seems to be unnecessary in view of the clear showing of the drawings.

Two bevel gears, 23 and 24, are shown keyed to the shaft 16 in such manner that they mesh with companion bevel pinions 25 and 26, in turn made rigid with the right angle shafts 27 and 28, having splined ends which may be selectively engaged with the power take-off of a tractor by means of the universal coupling rod 30. A dust proof thimble 31 will cover the one not in service.

The tubular gear and shaft housing, extended to both the housings 5 and 6, which are hollow, constitutes a very fine supporting structure for the rotary plow, allows power to be transmitted to it without twist on the frame 35 and lends itself readily to the required dust-proof construction in earth working power tools.

A frame 35 supports the structure heretofore described and transmits tractor draft by the tractor hitch 36. The universal coupling rod 30 is made to telescope so that it accommodates different depths of cut, the latter being regulated by setting the handles 37 and 38, which by virtue of the spring mounting 39 allows the cutter 123 to leave a practically uniform field of cut soil behind it notwithstanding furrows, mole hills and the common irregularities of a field. The ground wheels 40 find room to yield with little disturbance to the frame.

The thrust wheel 41 is supported well to the rear of the cutter 123, by the reachrod 42, pivoted at 43, and by a diagonal brace 44 (see Fig. I). A dust apron 45 is advisable.

While the plow from which these drawings were taken was originally carefully designed, then changed in details from time to time as by actual test seemed desirable, I do not desire to limit myself to the structure shown and described, but only to structures embodying the principle herein disclosed, as defined in the claims.

I claim:

1. A cutter for a rotary plow of the class described comprising a shaft, two spiral flanges in circumferential spaced relationship that are made rigid with the shaft and a cutter removably attached to each flange, the said cutters being characterized by being oblique helicoids, the surfaces of which are so formed that any section intersecting the axis of the oblique helicoid will be substantially straight.

2. A cutter for a rotary plow of the character described, comprising a shaft and a pair of circumferentially spaced oblique helicoid cutter flanges made rigid with the shaft, and oblique helicoid cutters removably attached to said flanges, the said oblique helicoid cutters being so formed that any longitudinal axial section thereof will be substantially straight and at a substantial angle to a line normal to the axis of the helicoid.

3. A cutter for a rotary plow of the character described, comprising a shaft and a pair of circumferentially spaced oblique helicoid cutter flanges made rigid with the shaft, and oblique helicoid cutters removably attached to said flanges, the said oblique helicoid cutters being so formed that any longitudinal axial section thereof will be substantially straight and at an angle of the order of thirty degrees from a line normal to the axis of the oblique helicoid.

4. A rotary plow adapted for tractor operation, comprising a frame, wheel supports for said frame and an oblique helicoid cutter mounted substantially normal to the line of travel of the frame for revoluble ground cutting contact beneath said frame, the cutter element of said oblique helicoid being so formed that any axial section thereof will be a substantially straight line at a substantial angle that is less than a right angle to the axis of the oblique helicoid.

5. A rotary plow adapted for tractor operation, comprising a frame, ground supports for said frame and an oblique helicoid cutter element mounted substantially normal to the line of travel of the frame for revoluble ground cutting contact beneath the frame, the cutter elements of said oblique helicoid being plural in number and so formed that any axial section of a cutter element will be a substantially straight line at an acute angle to the axis of the oblique helicoid.

6. A rotary plow adapted for tractor operation, comprising a frame, ground supports for said frame and oblique helicoid cutter elements mounted substantially normal to the line of travel of the frame for power driven revoluble ground cutting contact beneath the frame, the cutter elements of said oblique helicoid being plural in number and so formed that any axial section of a cutter element will be a substantially straight line at an acute angle to the axis of the oblique helicoid.

7. A cutter for a rotary plow comprising a shaft, and cutting blades of substantial width in spaced circumferential relationship around the shaft intermediate the ends thereof in spiral relationship to the axis of the shaft, the outside and inside surfaces of said blades being oblique helicoids whose generatrix is a straight line that glides along a fixed helix at a constant angle to the axis thereof, which angle is less than a right angle.

8. A cutter element for a rotary plow comprising a shaft and an oblique helicoid cutter made rigid with said shaft intermediate the ends thereof, the said oblique helicoid being so formed that any longitudinal axial section thereof is straight and at less than a right angle from the longitudinal axis of the helicoid.

GUSTAVE O. MATTER.